(12) United States Patent
Fujioka et al.

(10) Patent No.: US 8,139,186 B2
(45) Date of Patent: Mar. 20, 2012

(54) LIQUID CRYSTAL DISPLAY DEVICE

(75) Inventors: Kazuyoshi Fujioka, Osaka (JP);
Katsuya Ogawa, Osaka (JP); Koki Hongo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 12/746,017

(22) PCT Filed: Aug. 1, 2008

(86) PCT No.: PCT/JP2008/063905
§ 371 (c)(1),
(2), (4) Date: Jun. 3, 2010

(87) PCT Pub. No.: WO2009/072322
PCT Pub. Date: Jun. 11, 2009

(65) Prior Publication Data
US 2010/0253891 A1 Oct. 7, 2010

(30) Foreign Application Priority Data
Dec. 5, 2007 (JP) .................................. 2007-314746

(51) Int. Cl.
*G02F 1/1335* (2006.01)
(52) U.S. Cl. .................... 349/114; 349/113; 349/117
(58) Field of Classification Search .................. None
See application file for complete search history.

(56) References Cited

U.S. PATENT DOCUMENTS

| | | |
|---|---|---|
| 2005/0270462 A1 | 12/2005 | Koma |
| 2007/0097313 A1 | 5/2007 | Hayashi et al. |
| 2007/0263148 A1 | 11/2007 | Teramoto et al. |
| 2009/0073352 A1* | 3/2009 | Hamilton et al. ............... 349/96 |
| 2009/0195732 A1 | 8/2009 | Teramoto et al. |
| 2009/0219472 A1 | 9/2009 | Fujita et al. |

FOREIGN PATENT DOCUMENTS

| | | |
|---|---|---|
| CN | 101075039 A | 11/2007 |
| JP | 2003-279957 A | 10/2003 |
| JP | 2006-11400 A | 1/2006 |
| JP | 2006-71977 | 3/2006 |
| JP | 2006-292847 | 10/2006 |
| JP | 2007-93848 | 4/2007 |
| JP | 2007-121740 | 5/2007 |
| JP | 2007-279544 | 10/2007 |
| WO | WO 2006/050793 | 5/2006 |
| WO | WO 2007/063629 | 6/2007 |

OTHER PUBLICATIONS

International Search Report for PCT/JP2008/063905, mailed Nov. 4, 2008.
Supplementary European Search Report dated Dec. 8, 2010 issued in corresponding EP Appln. No. 08792118.8.

* cited by examiner

*Primary Examiner* — Richard Kim
(74) *Attorney, Agent, or Firm* — Nixon & Vanderhye, P.C.

(57) ABSTRACT

The present invention provides a LCD device providing wide viewing angle display and having an improved transmittance and contrast ratio. The present invention is a liquid crystal display device including:
a first substrate;
a liquid crystal layer; and
a second substrate in this order toward a display face,
wherein each of the first and second substrates includes a polarizer and a transparent electrode,
the first substrate includes a reflector,
the liquid crystal layer contains a liquid crystal material with negative dielectric anisotropy,
at least one of the first and second substrates includes a λ/4 retarder including a dielectric material,
the λ/4 retarder is arranged to overlap with the reflector when viewed from the display face, and
the λ/4 retarder is arranged on a liquid crystal side of the transparent electrode.

6 Claims, 7 Drawing Sheets

LIQUID CRYSTAL DISPLAY DEVICE

This application is the U.S. national phase of International Application No. PCT/JP2008/063905 filed 1 Aug. 2008, which designated the U.S. and claims priority to JP Application No. 2007-314746 filed 5 Dec. 2007, the entire contents of each of which are hereby incorporated by reference.

TECHNICAL FIELD

The present invention relates to LCD devices. More particularly, the present invention relates to MVA transflective LCD devices, which provide transmission display using transmission light from a light source such as a backlight and provide reflection display using ambient light having been reflected in the device.

BACKGROUND ART

According to LCD devices, alignment of LC molecules is controlled by an electric field formed between electrodes, thereby adjusting ON and OFF of LC display. Reflective, transmissive, and transmissive LCD devices are mentioned as the LCD devices.

Under relatively dark environments such as indoor environment, transmissive LCD devices using light from a light source such as a backlight are usually adopted. Under relatively bright environments such as outdoor environment, reflective LCD devices using ambient light are usually adopted. Transflective LCD devices can provide mainly transmission display under indoor environments and mainly reflection display under outdoor environments. So such transflective LCD devices can provide high quality display under any environments, both indoor and outdoor environments. Now such transflective LCD devices are installed in various mobile equipment such as a cellular phone, a PDA, and a digital camera. According to the transflective LCD devices, paths of display light are different between a transmission region and a reflection region. In reflection display, ambient light having passed through a reflection region of a LC layer is reflected by a reflection member and then passes through that region again. So light having passed through the LC layer twice is used for reflection display. In contrast, in transmission display, light having passed through a transmission region of the LC layer once is used for transmission display. So if the thickness of the LC layer is uniform between the transmission region and the reflection region, a retardation for light having passed through the LC layer is different between the two regions, failing to provide proper display. The thickness of the LC layer (cell gap) between the transmission region and the reflection region needs to be optimized for proper display. Typically, the LC layer is so designed that the thickness thereof in the transmission region is twice larger than that in the reflection region because the reflection light actually passes through the LC layer with a thickness twice larger than that of the LC layer through which the transmission light passes.

VA (vertical alignment) or IPS (in-plane switching) LCD devices are used as the LCD devices, for example. According to VA LCD devices, an electrode for controlling alignment of LC molecules is arranged on both substrates with a LC layer therebetween, and under no voltage application, the LC molecules are vertically aligned to the substrate surfaces. By applying a threshold voltage or higher between the both electrodes, the LC molecules are aligned in parallel to the substrate surfaces. According to IPS LCD devices, an electrode for controlling alignment of LC molecules is arranged on either one of a pair of substrates, and under no voltage application, the LC molecules are aligned in parallel to the substrate surfaces. By applying a threshold voltage or higher between the both electrodes, the LC molecules are aligned in parallel to the substrate surfaces in an in-plane direction. VA LCD devices are known to provide high contrast display. IPS LCD devices are known to provide wide viewing angle display.

LCD devices that provide reflection display need to have at least one $\lambda/4$ retarder in the reflection region together with a polarizer. This is because in reflection display, linearly-polarized light needs to be converted into circularly-polarized light, in principle. By arranging a $\lambda/4$ retarder together with a polarizer, linearly-polarized light having passed through the polarizer can be converted into circularly-polarized light. For example, Patent Document 1 discloses the following IPS LCD device including a $\lambda/4$ retarder. The $\lambda/4$ retarder is selectively arranged corresponding to a reflection layer, and a multi-gap structure is formed in order that a LC layer in a reflection region has a thickness smaller than a thickness of the LC layer in a transmission region.

According to VA LCD devices, MVA (multi-domain vertical alignment) LCD devices are now increasingly used because such devices are effective in increase in viewing angle and contrast ratio. VA LCD devices provide display by applying a voltage to a LC layer to tilt LC molecules, which are vertically aligned to substrate surfaces under no voltage application. MVA LCD devices provide wide viewing angle and high contrast display by tilting LC molecules toward a projection formed on surfaces facing a LC layer of substrates.

MVA transflective LCD devices also need to include a $\lambda/4$ retarder. The transflective LCD devices have a transmission region together with a reflection region. In the transmission region, another $\lambda/4$ retarder needs to be arranged, together with the $\lambda/4$ retarder arranged in the reflection region. However, a difference in parameter between such two different $\lambda/4$ retarders possibly leads to a reduction in contrast ratio of transmission display. In view of this, for example, Patent Document 2 discloses an LCD device with a multi-gap structure provided by arranging a retardation layer only in a reflection region, thereby creating a difference in LC layer thickness between the transmission region and the reflection region. According to the LCD device of Patent Document 2, projections (hereinafter, also referred to as a "rivet") are arranged in a dotted pattern when viewed from a display face to control LC molecules. Thus, this LCD device can provide wide viewing angle display.

Such LCD devices are now being rapidly developed. A further improvement in display qualities are strongly needed for MVA LCD devices.
[Patent Document 1]
Japanese Kokai Publication No. 2006-71977
[Patent Document 2]
WO 2007/063629

DISCLOSURE OF INVENTION

The present invention has been made in view of the above-mentioned state of the art. The present invention has an object to provide an LCD device providing wide viewing angle display and having an improved transmittance and contrast ratio.

The present inventors made various investigations on a further improvement in display qualities of MVA LCD devices, and then noted a $\lambda/4$ retarder, and arrangement and configuration of projections for controlling alignment of LC molecules. Then, the inventors found the followings. According to a conventional configuration of LCD devices, a multi-gap structure is formed by adjusting a thickness of an insulating film to create a difference in thickness of a LC layer between a transmission region and a reflection region. According to such a multi-gap structure, alignment of LC molecules near a shoulder portion of the multi-gap structure might become in disorder, resulting in a reduction in contrast ratio.

As a result of further investigations, the prevent inventors found that by arranging a dielectric component on a LC layer side of an electrode in the reflection region, a retardation between the transmission region and the reflection region can be compensated without forming the multi-gap structure. Further, the inventors found that by using this dielectric component as a projection for LC molecule alignment control, the viewing angle can be further increased, and the transmittance and the contrast ratio can be dramatically improved. As a result, the above-mentioned problems have been admirably solved, leading to completion of the present invention.

The present invention is a liquid crystal display device including:
a first substrate;
a liquid crystal layer; and
a second substrate in this order toward a display face,
wherein each of the first and second substrates includes a polarizer and a transparent electrode,
the first substrate includes a reflector,
the liquid crystal layer contains a liquid crystal material with negative dielectric anisotropy,
at least one of the first and second substrates includes a λ/4 retarder including a dielectric material,
the λ/4 retarder is arranged to overlap with the reflector when viewed from the display face, and
the λ/4 retarder is arranged on a liquid crystal side of the transparent electrode.

The LCD device of the present invention is mentioned below in more detail.

The LCD device of the present invention includes a first substrate, a LC layer, and a second substrate in this order toward a display face, and each of the first and second substrates includes a polarizer and a transparent electrode. Specifically, the first substrate of the LCD device of the present invention includes both a polarizer and a transparent electrode, and the second substrate also includes both a polarizer and a transparent electrode. In the present invention, the first and second substrates are arranged with the LC layer therebetween, and so the polarizers and the transparent electrodes are also arranged to face each other with the LC layer therebetween, respectively. The thus-arranged pair of polarizers each have a transmission axis that transmits one component of linearly-polarized light and an absorption axis that absorbs the other component thereof. The pair of polarizers is arranged so that the transmission axes thereof are arranged in parallel or perpendicular to each other and also the absorption axes thereof are arranged in parallel or perpendicular to each other, thereby transmitting or blocking light entering the polarizer. The arrangement relationship of the transmission axes and the absorption axes of the polarizers can be appropriately determined depending on display type (for example, normally black type where black display is provided under no voltage application between electrodes, or normally white type where white display is provided under no voltage application between electrodes). According to the LCD device of the present invention, a voltage is applied to a pair of transparent electrodes to form an electric field in the LC layer, thereby controlling alignment of LC molecules and switching ON and OFF of display. The material and configuration of the transparent electrodes are not especially limited as long as they have conductivity and can transmit light to such a degree that the transmitted light can be used for display.

The above-mentioned first substrate includes a reflector. In this case, incident light passes through the LC layer and then is reflected by the reflector, and again passes through the LC layer. The reflector is arranged for reflection display, and the material and configuration thereof are not especially limited as long as it can reflect light to such a degree that the reflected light can be used for display. The region where the reflector is arranged corresponds to the reflection region of the LCD device of the present invention. Further, a region free from the reflector, i.e., a region that transmits light from a light source such as a backlight corresponds to the transmission region of the LCD device of the present invention. In the present description, the reflection region and transmission region mean not only regions in the planar direction but also regions in the depth direction when viewed from the display face.

The LC layer contains LC materials with negative dielectric anisotropy. The director of such LC materials with negative dielectric anisotropy ($\Delta \in$) is vertical to an electric field. Accordingly, the LC molecules are aligned vertically to the substrate surfaces under no voltage application and aligned in parallel thereto by application of a threshold voltage or higher. Specifically, the LCD device of the present invention is a VA display. It is preferable in view of excellent display that the LC materials are nematic LCs with high symmetry property.

At least one of the first and second substrates includes a λ/4 retarder including a dielectric material. The λ/4 retarder is arranged to overlap with the reflector when viewed from the display face. The λ/4 retarder gives a retardation of λ/4 between two polarization components oscillating in mutually-perpendicular two directions of light entering this retarder. Specifically, the λ/4 retarder gives a retardation of λ/4, i.e., 90 nm to 195 nm for visible light (360 nm to 780 nm) used for display. More preferably, the λ/4 retarder gives a retardation of about 100 to 150 nm, which is about ¼ of 550 nm of light human can recognize. When such a λ/4 retarder is arranged so that an angle made by its phase advance or delay axis and the transmission or absorption axis of the polarizer is 45°, the λ/4 retarder gives a specific retardation for light entering the polarizer and the λ/4 retarder. The retardation value can be appropriately determined depending on an arrangement embodiment of the polarizers, a display region, and the like. In the present invention, the arrangement embodiment of the λ/4 retarder is not especially limited as long as it can convert linearly-polarized light into circularly-polarized light and gives a proper retardation for ON-OFF display control. It is preferable that the λ/4 retarder is not arranged in the transmission region, i.e., in a region where the reflector is not arranged, so that a reduction in contrast due to light leakage can be prevented, the light leakage possibly being caused when λ/4 retarders arranged on different substrates have different parameters. According to the present invention, there is no need to form the λ/4 retarder over the entire first and second substrates, and the λ/4 retarder can be arranged on portions of such substrates as a dielectric component functioning as a member for controlling alignment of the LC molecules. So the proportion of the region where the λ/4 retarder is arranged in the transmission region can be efficiently decreased. As a result, the LCD device of the present invention can improve the contrast ratio with efficiency, compared to conventional MVA LCD devices.

The λ/4 retarder is arranged on the LC layer side of the transparent electrode. The dielectric component is arranged in the electric field, and thereby a certain capacitance is formed in the dielectric component and voltage division is generated. So the applied voltage is different between the region where the dielectric component is arranged in the electric field and the other region. An alignment degree of the LC molecules depends on a level of a voltage applied between the electrodes, and depending on this alignment degree, a retardation given for light passing through the LC layer is determined. By adjusting a material, size, thickness of the dielectric component in accordance with this principle, a retardation between the transmission region and the reflection region can be adjusted without forming a multi-gap structure. As a result, the reduction in contrast ratio, which is due to light leakage possibly generated at a shoulder portion of a multi-gap structure, can be prevented. Thus, the contrast ratio can be more improved, compared to conventional transflective LCD devices.

The $\lambda/4$ retarder and the transparent electrode are usually arranged in this order toward the LC layer, but in the present invention, the transparent electrode and the $\lambda/4$ retarder are arranged in this order toward the LC layer, which is one of advantages of the present invention.

The $\lambda/4$ retarder includes a dielectric material, so the LC molecules near the $\lambda/4$ retarder are tilted thereto. Specifically, in the present invention, the $\mu/4$ retarder itself controls LC molecules. Thus, the LCD device of the present invention is a MVA display and can provide wider viewing angle and higher contrast display compared to common VA LCD devices not including such a dielectric component as a member for LC alignment control.

The configuration of the LCD device of the present invention is not especially limited. The LCD device may or may not include other components as long as it essentially includes such components. For example, lines, electrodes, switching elements, a control circuit, and the like for LC driving control may be disposed on the pair of substrates with the LC layer therebetween. In addition to such substrates, the LCD device may include a light source such as a backlight emitting light as transmission display light, a peripheral circuit such as a driver for controlling the above-mentioned lines, and the like.

Other preferable embodiments of the LCD device of the present invention are mentioned below.

It is preferable that the $\lambda/4$ retarder has a linear shape when viewed from the display face (in the direction vertical to the substrate surface), and the $\lambda/4$ retarder projects toward the liquid crystal layer when viewed in a direction parallel to the display face (in the direction of the substrate cross-section). In other words, the $\lambda/14$ retarder of the present embodiment has a linear shape when the substrate face is viewed in plane (such a projection is also referred to as a rib). The size, shape, and the like of the $\lambda/4$ retarder are not especially limited as long as it has a substantially linear shape. For example, the $\lambda/4$ retarder may have a bended, branched, or disconnected portion. When the $\lambda/4$ retarder is viewed in cross section of the substrates, the angle, height, and the like of the projection are not especially limited as long it projects toward the LC layer. For example, the projection may have a columnar shape and a taper shape. The $\lambda/4$ retarder having such a shape can control LC molecules over a wide range with higher control accuracy.

It is preferable that the reflector has a linear shape when viewed from the display face, and the $\lambda/4$ retarder has a width smaller than a width of the reflector. Specifically, according to the present embodiment, the reflector is also formed to have a linear shape like the rib, and the rib is formed to be thin within a region where the reflector is arranged. In the present description, the width means a length of a transverse direction with respect to the longitudinal direction of the linear shape.

The width is thus-controlled, which can prevent light leakage through the vicinity of the rib. As a result, the contrast ratio can be increased. According to such an embodiment, even if misalignment between the $\lambda/4$ retarder and the reflector occurs in production, an effect of shielding light by the reflector can be sufficiently provided. Further, in this case, the contrast ratio is improved with an increase in difference in width between the $\lambda/4$ retarder and the reflector.

It is preferable that the width of the $\lambda/4$ retarder is not less than 0.5 times the width of the reflector. If the width of the $\lambda/4$ retarder is less than 0.5 times that of the reflector, gray scale reverse display (gray display) might occur even if a threshold voltage or lower is applied to the LC layer. If the $\lambda/4$ retarder has a width less than half the width of the reflector, the contrast ratio is improved, but the transmittance is decreased because an area of a portion light-shielded by the reflector is increased. Further, more preferably, the width of the $\lambda/4$ retarder is not less than 0.6 times the width of the reflector. This can almost suppress the gray scale reverse display. Still more preferably, the width of the $\lambda/4$ retarder is 0.6 to 0.7 times that of the reflector because light leakage through the vicinity of the rib can be suppressed and a balance between the contrast ratio and the transmittance can be optimized.

It is more preferable that wherein the $\lambda/4$ retarder is positioned within a region where the reflector is arranged, and a distance from a first side of the reflector and a first side of the $\lambda/4$ retarder is the same as a distance from a second side of the reflector and a second side of the $\lambda/4$ retarder. Under such conditions, the light leakage due to the rib can be more surely prevented. When the above-mentioned embodiment where the width of the $\lambda/4$ retarder is not less than 0.5 times that of the reflector is applied to the present embodiment, it is preferable that a distance from the first side of the reflector and the first side of the $\lambda/4$ retarder and a distance from the second side of the reflector to the second side of the $\lambda/4$ retarder are each not more than 0.25 times the width of the reflector. More preferably, the distance from the first side of the reflector to the first side of the $\lambda/4$ retarder and the distance from the second side of the reflector to the second side of the $\lambda/4$ retarder are each 0.15 to 0.2 times the wide of the reflector. According to such a design, light leakage through the vicinity of the rib can be suppressed, and a balance between the contrast ratio and the transmittance, suitable for display, can be provided.

It is preferable that a retardation control alignment film is arranged between the $\lambda/4$ retarder and the transparent electrode. In the present description, the retardation control alignment film means a film capable of controlling alignment of molecules in a layer formed on this retardation control alignment film. Due to this alignment film, a layer formed thereon can show a certain retardation control capability for light. Accordingly, the alignment film is formed independently from a film (a common alignment film) for controlling alignment of LC molecules of the LC layer. This retardation control alignment film can expand a range of choice of a material for the $\lambda/4$ retarder, i.e., for the alignment control member including a dielectric material and permits easy formation of the $\lambda/4$ retarder.

It is preferable that the reflector is a pixel driving line. The pixel driving line is not especially limited as long as it is used for driving pixels. Examples thereof include a scanning line, a signal line, a storage capacitor line, a drain-drawing line extended from a TFT. The material for the reflector is also used for these lines, which simplifies the configuration of the device.

EFFECT OF THE INVENTION

The LCD device of the present invention is a MVA display and it can provide wide viewing angle and high contrast display. The area of the λ/4 retarder in the transmission region can be significantly reduced, which can increase a contrast ratio. Further, the multi-gap structure does not need to be formed, so light leakage possibly generated at a shoulder portion of the multi-gap structure can be effectively prevented, leading to a further improvement in contrast ratio.

BEST MODES FOR CARRYING OUT THE INVENTION

The present invention is mentioned in more detail with reference to the drawings showing examples of preferred embodiments but not limited thereto.

Embodiment 1

FIG. 1 is a cross-sectional view schematically showing a configuration of an LCD device in accordance with Embodiment 1. As shown in FIG. 1, the LCD device of Embodiment 1 is so configured that a first substrate 1 and a second substrate 2 are arranged with a LC layer 3 therebetween. In Embodiment 1, the second substrate 2 is a display face side substrate and the first substrate 1 is a back face side substrate. Further, the first substrate 1 is an active matrix substrate and the second substrate 2 is a color filter substrate. Specifically, the LCD device of Embodiment 1 includes the first substrate 1, the LC layer 3, and the second substrate 2 in this order toward the display face.

The LCD device of Embodiment 1 is a transflective LCD device including a reflector 12 partly arranged and a backlight as a light source. This allows the LCD device of Embodiment 1 to provide transmission display using transmission light from the backlight as display light and reflection display using reflected ambient light as display light. Hereinafter, the region for transmission display is referred to as a transmission region T and the region for the reflection display is referred to as a reflection region R.

The LCD device of Embodiment 1 is a MVA display. Nematic LCs with negative dielectric anisotropy are used as a material for the LC layer 3. The LC molecules inside the LC layer 3 align vertically to the substrate surfaces under no voltage application, and upon application of a threshold voltage or higher, the molecules align horizontally thereto.

The first substrate 1 includes a first glass substrate 1 as a main substrate, and also includes a first λ/2 retarder 15 and a first polarizer 16 on a back face side of the substrate 11. The second substrate 2 includes a second glass substrate 21 as a main substrate, and also includes a second λ/2 retarder 25 and a second polarizer 26 in this order on a display face side of the substrate 21.

The first polarizer 16 and the second polarizer 26 are arranged in cross-Nicol. Specifically, transmission axes of the first polarizer 16 and the second polarizer 26 are perpendicular to each other and absorption axes thereof are also perpendicular to each other. According to such an LCD device of Embodiment 1, two polarization components of light are both blocked by the pair of polarizers under no voltage application, and one of the components transmits the panel attributed to birefringence of the LC molecules to be used for display. Specifically, the LCD device is a normally black display. The first λ/2 retarder 15 and the second λ/2 retarder 25 can compensate coloring caused by wavelength dispersion caused by the below-mentioned λ/4 retarder.

A reflector 12 is provided on the LC layer 3 side-surface of the first glass substrate 11. Incident light from the display surface (the second substrate 2) is reflected by the thus-arranged reflector 12 to be used as display light. Examples of materials for the reflector 12 include aluminum (Al), silver (Ag), and an alloy thereof. A region where the reflector 12 is arranged corresponds to the reflection region R of the entire device.

A pixel electrode 14 is arranged on the LC layer 31 side of the reflector 12 with an insulating film 13 therebetween. The pixel electrode 14 is a transparent and colorless metal film, and an ITO (indium tin oxide) film may be used, for example. The pixel electrode 14 is partly provided with a slit 17.

A color filter layer 23 is arranged on the LC layer 3 side-surface of the second glass substrate 21. The color filter layer 23 includes colored layers of respective colors, each of which preferentially transmits visible light at a specific wavelength range. Three colored layers of red, green, and blue are arranged in each pixel as the colored layers. Examples of materials for the color filter layer include an organic resin into which a specific color pigment has been dispersed and an organic resin having been dyed with a specific color. A common electrode 24 is arranged over the entire LC layer 3-side surface of the color filter layer 23. The common electrode 24 is a colorless and transparent metal film like the pixel electrode 14, and an ITO film may be used. By application of a threshold voltage or higher between the pixel electrode 14 and the common electrode 24, an electric field is formed in the LC layer 3, and then, the LC molecules are uniformly aligned.

On the LC layer 3 side-surface of the common electrode 24, alignment control projections 22 are arranged. The projections 22 project toward the LC layer 3 when viewed in a direction parallel to the display face. The projection 22 is a dielectric component. Toward this projection 22, the LC molecules are tilted under no voltage application. According to this configuration, the LC molecules are obliquely aligned under no voltage application, and by voltage application, the LC molecules are sequentially tilted from the LC molecules near the projection 22. As a result, the LCD device can provide wider viewing angle and higher contrast display.

FIGS. 2 and 3 are plan views each showing one pixel of Embodiment 1. FIG. 2 characteristically shows a configuration of the pixel. FIG. 3 characteristically shows alignment directions of LC molecules. The first substrate 1 includes gate lines 41 and data lines 42 arranged perpendicular to each other. At each intersection of the gate line 41 and the data line 42, a TFT (thin film transistor) 43 is arranged. The TFT 43 is a 3-terminal transistor including a semiconductor layer, a gate electrode, a source electrode, and a drain electrode. The TFT 43 functions as a switching element for controlling a signal voltage applied to the gate lines 41 and the data lines 42. To the TFT 43, the pixel electrode 14 is connected. The pixel electrodes 14 on the entire substrate are equally spaced to be arranged in a matrix pattern when viewed from the display face. The shape of each pixel electrode 14 is not especially limited and a rectangular or square shape is mentioned. A portion of such a rectangular or square shape may be curved or lacked. One pixel electrode 14 region corresponds to one pixel region. Thus, the alignment of LCs and coloring are controlled in each pixel, and so the LCD device of Embodiment 1 provides high-resolution color display. According to Embodiment 1, the pixel electrode 14 is partly provided with a slit 17. According to this, some LC molecules are tilted toward the slit 17 under no voltage application, like toward the projection 22. The first substrate 1 further includes storage capacitor lines 44 extending in parallel to the gate lines to bisect the pixel. This storage capacitor line 44 forms a storage capacitor between itself and a drain-drawing line extended from the drain electrode. This drain-drawing line is connected to the pixel electrode through a contact hole 46.

In Embodiment 1, the drain-drawing line, which is one of pixel driving lines, is means for electrically connecting itself to the pixel electrode and also functions as a reflector. Specifically, the drain-drawing line is made of a reflection material such as aluminum (Al) and corresponds to the reflector 12 in FIG. 1.

As shown in FIG. 2, the projection (rib) 22 on the CF substrate side in Embodiment 1 has a linear shape. More specifically, the projection 22 is arranged in an oblique direction, where the gate line 41 direction is a transverse direction and the data line 42 direction is a vertical direction. The rib 22 may have a straight shape or a curved shape as long as it has a linear shape. For example, any one of the ribs 22 bends at a right angle near the center of the pixel to have a substantially V-shape. The ribs 22 are equally spaced, and this permits uniform alignment of LC molecules in each pixel. According to Embodiment 1, in addition to the rib 22, slits 17 of the pixel electrode (hereinafter, also referred to as an electrode slit) control alignment of the LC molecules. The electrode slits 17 also have a linear shape like the rib 22 when the substrate face is viewed from above. The electrode slits 17 are also equally spaced. The ribs 22 and the electrode slits 17 are alternately arranged. The ribs 22 and the electrode slits 17 overlap with one pixel electrode 14. The shapes of the ribs 22 and the electrode slits 17 that overlap with the rectangular pixel electrode 14, and an area ratio between the transmission region and the reflection region are both symmetry with respect to a line bisecting the pixel electrode in the transverse direction (bisecting the long side of the rectangle). Thus, the LC molecules are aligned in a well-balanced manner in the LCD device of Embodiment 1.

The alignment direction of the LC molecules is mentioned in more detail. As shown in FIG. 3, by applying a threshold voltage or higher to the LCD device of Embodiment 1, the LC molecules 47 uniformly align in a direction perpendicular to the ribs 22 and the electrode slits 17. In Embodiment 1, the ribs 22 and the electrode slits 17 are each formed to have a linear shape, and further into a substantially V shape. The LC molecules 47 are equally divided into those aligning in the right-oblique direction and into those aligning in the left-oblique direction, resulting in extremely excellent wide viewing angle display.

In Embodiment 1, the rib 22 is arranged to overlap with the reflector when viewed from the display face. The rib 22 has a width smaller than the width of the reflector. More specifically, the rib 22 is positioned within a region where the reflector 12 is arranged, and a distance from a first side of the reflector 12 and a first side of the rib 22 is the same as a distance from a second side of the reflector 12 and a second side of the rib 22. The distance is about 12% of the width of the reflector 12. In Embodiment 1, the width of the reflector is 12 μm, and each of the distance from the first side of the reflector 12 and the first side of the rib 22 and the distance from the second side of the reflector 12 and the second side of the rib 22 is 2 μm. This results in that the width of the rib 22 is about 65% of the width of the reflector. According to this, light leakage from the vicinity of the rib 22 can be prevented and the balance between the contrast ratio and the transmittance can be optimized. As in Embodiment 1, the width of the rib 22 and the width of the reflector 12 are specified in order to suppress gray scale reverse display when no voltage or a threshold voltage or higher is applied. As a result, display with high contrast ratio can be kept.

The reflector 12 in Embodiment 1 is arranged to overlap with the rib 22 and the storage capacitor line 46 when viewed from the display face. A certain capacitance is formed between the storage capacitor line 46 and the reflector (drain-drawing line) 12. The storage capacitor line 46 has light-shielding property. By arranging the reflector 12 to overlap with the rib 22 and the storage capacitor line 46, the region where the reflector 12 is arranged can contribute to display, which is efficient in display. So the reflector 12 in Embodiment 1 in each pixel has a W shape.

The rib 22 in Embodiment 1 also functions as a λ/4 retarder and can give a λ/4 retardation between two polarization components oscillating in mutually-perpendicular two directions of light entering the rib 22. The rib 22 has a multi-layer structure composed of a λ/4 retarder 27 and a retardation control alignment film 28, and gives a retardation of λ/4 for transmission light, and further converts linearly-polarized light into circularly-polarized light. The reflectance of the light is not especially limited and may be appropriately determined. Specifically, in Embodiment 1, the rib 22 includes the retardation control alignment film 28 between the λ/4 retarder 27 and the common electrode 24.

The λ/4 retarder 27 may be formed in the following procedure. The retardation control alignment film 28 is firstly formed and thereon, the λ/4 retarder 27, which controls alignment of molecules by the action of the film 28, and then the layer 27 is patterned into a desired shape by photolithography. The alignment film 28 can easily provide the λ/4 retarder 27, which is formed thereon, with a λ/4 retardation control function. Specifically, the λ/4 retarder 27 controls alignment of molecules by the act of the alignment film 28.

Polyimide resin may be used as a material for the alignment film 28. Mesogen group-containing compounds (monomers) may be used as a material for the λ/4 retarder 27. Examples thereof include polymerizable LC (polymerizable group-containing LC) materials such as polymerizable nematic LC. The mesogen group means an atomic group forming a thin and long rod shape or a planar shape and containing a permanent dipole in a size suitable for maintaining liquid crystal state.

The μ/4 retarder 27 may be formed by the following method, specifically. A resin composition containing a material for the retardation control alignment film solved therein is applied on a surface of a base on which the alignment film is to be formed. Then, the composition is dried and then provided with rubbing to form the retardation control alignment film 28. On the thus-formed film 28, a material for the λ/4 retarder 27 is applied and then patterned by photolithography. According to another procedure, a photo-alignment material is applied on a surface of a base on which the retardation control alignment film is to be formed and then irradiated with UV for alignment control to form the film 28, and thereon, for example, a composition material containing a mesogen group is polymerized and cured to form the λ/4 retarder 27.

In Embodiment 1, the rib 22 is arranged on the LC layer 3 side of the common electrode 24 and it is a dielectric component. So the region where the rib 22 is arranged and the other region are different in electric potential due to voltage drop by the dielectric component. The alignment property of the LC molecules is determined by an applied voltage level, and so by adjusting a refractive index by the thickness or material of the rib 22, a retardation between the transmission region T and the reflection region R can be compensated to be almost the same without forming a multi-gap structure.

Embodiment 2

FIG. 4 is a cross-sectional view schematically showing a configuration of an LCD device of Embodiment 2. The LCD device of Embodiment 2 has the same configuration as in Embodiment 1, except that the rib 22 further includes a top portion 29 made of novolac resin on the LC layer 31 side surface, in addition to the alignment film 48 and the λ/4 layer 47. The novolac resin is a material commonly used for the rib 22. This top portion 29 allows suppression of charge-up of DC potential upon voltage application, and image sticking phenomenon can be suppressed. However, the same effects as in Embodiment 1 are virtually obtained. The reason of this is as follows. In Embodiment 2, the rib 22 is arranged to overlap with the reflector 12, and so image sticking phenomenon in transmission display is hardly observed. Also in reflection display, it is hardly observed because the contrast ratio is about 1/100 of that in transmission display.

Embodiment 3

FIG. 5 is a cross-sectional view schematically showing a configuration of an LCD device of Embodiment 3. The LCD device of Embodiment 3 is the same as in Embodiment 1, except that the LCD device includes no λ/2 retarder. According to the present invention, the rib 22 is mainly arranged in the reflection region R, and so coloring caused by wavelength dispersion caused by the λ/4 retarder in the rib 22 less occurs. In such a case, an embodiment no λ/2 retarder is arranged may be employed.

Embodiment 4

FIG. 6 is a cross-sectional view schematically showing a configuration of an LCD device of Embodiment 4. The LCD device of Embodiment 4 is the same as in Embodiment 1, except that the drain-drawing line is not used as the reflector and instead, a reflector 18 is independently arranged. The reflector 18 of Embodiment 4 is formed on the pixel electrode 13. Such a reflector can be formed by spattering or pattern-formed by photolithography. This makes it easy to pattern the drain line. The reflector 18, which is formed independently from the drain-drawing line, may be formed between the glass substrate 11 and the insulating film 13, although it is formed on the pixel electrode 14 (on the LC layer side) in this Embodiment.

Comparative Embodiment 1

An LCD device of Comparative Embodiment 1 includes rivets in place of the ribs as the alignment control projection. The rivets are arranged in a dotted pattern when viewed from the display face. The λ/4 retarder is arranged in the entire display region between a λ/2 retarder and a glass substrate and is not arranged between a LC layer and a transparent electrode. So the λ/4 retarder is formed also in a transmission region. The rivets enable the LC molecules to radially align, and such alignment permits wide viewing angle display (hereinafter, also referred to as CPA (continuous pinwheel alignment) display type.

Comparative Example 2

An LCD device of Comparative Embodiment 2 includes ribs and electrode slits as the alignment control projection. Further, a λ/4 retarder is arranged in the entire display region between a λ/2 retarder and a glass substrate and is not arranged between a LC layer and a transparent electrode. So the λ/4 retarder is formed also in a transmission region.

Comparative Embodiment 3

An LCD device of Comparative Embodiment 3 includes rivets as the alignment control projection. The λ/4 retarder is arranged only in a reflection region, not in the transmission region. The LCD device includes a λ/4 retarder and a retardation control alignment film, as in Embodiment 1, and further includes a flattening layer to provide a multi-gap structure. This multi-gap structure permits compensation of a retardation between a transmission region and a reflection region, and so the λ/4 retarder is arranged between a common electrode and a glass substrate, unlike in Embodiment 1.

The LCD device of Comparative Embodiment 3 is mentioned in detail below. FIG. 7 is a cross-sectional view schematically showing a configuration of the LCD device of Comparative Embodiment 3. As shown in FIG. 7, the LCD device of Comparative Embodiment 3 is so configured that a first substrate 101 and a second substrate 102 are arranged with a LC layer 103 therebetween. In Comparative Embodiment 3, the second substrate 102 is a display face side substrate and the first substrate 101 is a back face side substrate. Further, the first substrate 101 is an active matrix substrate and the second substrate 102 is a color filter substrate.

The LCD device of Comparative Embodiment 3 is a CPA display. Nematic LCs with negative dielectric anisotropy are used as a material for the LC layer 103. The LC molecules inside the LC layer 103 align vertically to the substrate surfaces under no voltage application, and upon application of a threshold voltage or higher, the molecules align horizontally thereto.

The first substrate 101 includes a first glass substrate 11 as a main substrate, and also includes a first λ/2 retarder 115 and a first polarizer 116 on a back face side of the substrate 111. The first substrate 102 includes a second glass substrate 112 as a main substrate, and also includes a second λ/2 retarder 125 and a second polarizer 126 in this order on a display face side of the substrate 121. The first polarizer 116 and the second polarizer 126 are arranged in cross-Nicol. Specifically, transmission axes of the first polarizer 116 and the second polarizer 126 are perpendicular to each other and absorption axes thereof are also perpendicular to each other. According to such an LCD device of Comparative Embodiment 3, two polarization components of light are both blocked by the pair of polarizers under no voltage application, and one of the components transmits the panel attributed to birefringence of the LC molecules to be used for display. Specifically, the LCD device is a normally black display. The first λ/2 retarder 115 and the second λ/2 retarder 125 can compensate coloring caused by wavelength dispersion caused by the below-mentioned λ/4 retarder.

A pixel electrode 114 is arranged on the LC layer 131 side of the reflector 112 with an insulating film 113 therebetween. The pixel electrode 114 is a transparent and colorless metal film, and an ITO (indium tin oxide) film may be used, for example. The pixel electrode 114 is not provided with a slit unlike in Embodiment 1.

A reflector 112 is provided on the LC layer 131 side-surface of the pixel electrode 114. Incident light from the display surface (the second substrate 102) is reflected by the thus-arranged reflector 112 to be used as display light. Thus, the LCD device of Comparative Embodiment 3 is also a transflective LCD device having a transmission region T and a reflection region R.

On the LC layer 103 side of the second glass substrate 121, a color filter layer 123 is arranged. The color filter layer 123 includes colored layers of three colors, e.g., red, green, and blue. A common electrode 124 is arranged over the entire LC layer 103 side-surface of the color filter layer 123. The common electrode 124 is a transparent and colorless metal film like the pixel electrode 114, and an ITO film may be used for example. By application of a threshold voltage or higher between the pixel electrode 114 and the common electrode 124, an electric field is formed in the LC layer 103, and then, the LC molecules are uniformly aligned.

On the LC layer 103 side of the common electrode 124, alignment control projections 122 are arranged. The projections 122 are dielectric components. Toward this projection 122, the LC molecules are tilted under no voltage application.

FIGS. 8 and 9 are plan views showing one pixel of Comparative Embodiment 3. FIG. 8 mainly shows a configuration of the pixel characteristically. FIG. 9 mainly shows alignment directions of LC molecules characteristically. The first substrate 101 includes gate lines 141 and data lines 142 arranged perpendicular to each other. At each intersection of the gate line 141 and the data line 142, a TFT (thin film transistor) 143 is arranged. To the TFT 143, the pixel electrode 114 is connected. The pixel electrodes 114 are arranged in a matrix pattern when viewed from the display face.

Referring to FIG. 8, the projections 122 (rivets) on the CF substrate side are arranged in a dotted pattern when viewed from the display face. Specifically, as shown in FIG. 9, the LC molecules 147 are radially aligned toward the rivet 122 by application of a threshold voltage or higher to the LCD device.

On the color filter 123, a flattening layer 129, a λ/4 retarder 127, a retardation control alignment film 128, a common electrode 124, and the rivet 122 are stacked in this order toward the LC layer 131. The μ/4 retarder 127 and the alignment film 128 have the same configuration as in Embodiment 1, but the flattening layer 129 is not arranged in the LCD device of Embodiment 1. The flattening layer 129 is formed to provide a multi-gap structure. The thickness (d1) of the LC layer 131 in the transmission region T is twice as large as the thickness (d2) thereof in the reflection region R. The reflector 112 is arranged on the pixel electrode 114 (on the LC layer side) independently from the pixel driving lines.

Evaluation Test 1

The LCD devices of Embodiment 1 and Comparative Embodiments 1 to 3 were measured for transmittance, reflectance, and contrast ratio and then compared with each other in these points. Table 1 shows configurations of the respective LCD devices used in Evaluation test 1. 8-inch LCDs with 800×RGB×480 resolution and 72.5 μm×217.5 μm pitch were used in the Evaluation Test 1.

TABLE 1

|  | Display Mode | Cell thickness (μm) | | LC | |
| --- | --- | --- | --- | --- | --- |
|  |  | d1 (transmission) | d2 (reflection) | Δn | chiral pitch |
| Embodiment 1 | MVA | 3.2 | 1.8 | 0.098 | — |
| Comparative Embodiment 1 | CPA | 3.4 | 1.7 | 0.098 | 60 μm |
| Comparative Embodiment 2 | MVA | 3.2 | 1.8 | 0.098 | — |
| Comparative Embodiment 3 | CPA | 3.4 | 1.7 | 0.098 | 60 μm |

Table 2 shows measurement data determined in the Evaluation Test 1. The transmittance is a ratio (%) of energy of transmitted light to energy of incident light The reflectance is a ratio (%) of energy of reflected light to energy of incident light. The contrast ratio is a luminance in white display state/luminance in black display state. The transmittance and reflectance of the LCD device of Embodiment 1 and Comparative Embodiments 1 and 3 are actual measured values, but those in Comparative Embodiment 2 are simulated values.

TABLE 2

|  | Transmissive display | | | |
| --- | --- | --- | --- | --- |
|  | λ/4 film | Transmittance | Contrast ratio | Reflectance |
| Embodiment 1 | only reflective region | 2.8% | 93% | 2100 | 3.9% |
| Comparative Embodiment 1 | Entire display region | 3.0% | 100% | 450 | 4.0% |
| Comparative Embodiment 2 | Entire display region | 2.9% | 95% | 880 | 3.9% |
| Comparative Embodiment 3 | only reflective region | 2.4% | 80% | 780 | 3.9% |

As shown in Table 2, the transmittance is improved in Embodiment 1, compared with Comparative Embodiment 3. In the LCD device of Comparative Embodiment 3, LCs are aligned in all azimuths to be symmetry with respect to the rivet in white display state during voltage application. So some LC molecules are aligned at degrees other than 45° with respect to the polarization axis, which leads to a decrease in transmittance. Such LC molecules are theoretically half of the total number of LC molecules, which leads to a decrease in transmittance to 50%. In fact, however, the LC layer contains chiral materials (cholestic LCs) the chiral pitch of which is several micrometers so that the LC molecules more stably align in all azimuths. The LC molecules are aligned to form a twist structure, and so the LC cell has optical rotation like TN (Twisted Nematic) LC cell. So the measurement values are different from the theoretical values.

According to the LCD device in Embodiment 1, the contrast ratio in transmission display is also improved, compared with the LCD device of Comparative Embodiment 3. According to Comparative Embodiment 3, the λ/4 retarder is arranged in the reflection region, so the reduction in contrast ratio caused by misalignment between the λ/4 retarders does not occur in the transmission region. However, the multi-gap structure is formed for reflection display, and so at a shoulder portion of the structure, some LC molecules can not kept aligning vertically to the substrate surfaces. So even in black display state, light leakage occurs, which causes a reduction in contrast ratio.

In contrast, in Embodiment 1, the ribs are arranged on the LC layer side of the common electrode in the reflection region to cause a voltage drop to adjust alignment of LC molecules. Thus, the retardation between the reflection region and the transmission region is adjusted. So there is no need to form a multi-gap structure, which leads to an increase in contrast ratio. The rib is arranged in a region where the reflector is arranged when viewed from the display face and has a width smaller than that of the reflector. So light leakage from the vicinity of the rib does not occur, which also leads to an increase in contrast ratio.

Evaluation Test 2

Influences of a relationship between the width of the reflector and the width of the rib on the display characteristics are determined by Evaluation Test 2, which is shown in Table 3. In Table 3, the "width of light-shielding region" means a distance from one side of the reflector to the adjacent side of the rib when viewed from the display face.

TABLE 3

| Width of light-sheiding region | Contrast ratio |
| --- | --- |
| — | 880 |
| 0.0 μm | 1050 |

TABLE 3-continued

| Width of light-sheiding region | Contrast ratio |
|---|---|
| 0.5 μm | 1480 |
| 1.0 μm | 1640 |
| 1.5 μm | 1850 |
| 2.0 μm | 2100 |
| 3.0 μm | 2150 |
| 4.0 μm | 2155 |
| 5.0 μm | 2160 |

As shown in Table 3, the contrast ratio is increased with an increase in the width of the light-shielding region. However, as the increase in the width of the light-shielding region, the reflection region becomes larger, leading to a reduction in transmittance.

Influences of the width of the light-shielding region on the display characteristics are shown in FIG. 10. In FIG. 10, the respective curves showing a ratio (%) (hereinafter, also referred to as a reflectance ratio) of a reflectance in black display state to a reflectance in white display state, relative to an applied voltage (V) to LC when the rib width accounts for 20%, 40%, 50%, or 60% of the reflector width. As shown in FIG. 10, in each curve, the reflectance ratio is low at 0 to 3V (black display) and sharply increases near at 3V to reach to 100% at 8V (white display). When the rib width accounts for 60% of the reflector width, the reflectance ratio is about 20% and gray scale reverse display (gray display) is observed even at 0 to 3V. These data shows that the gray scale reverse display is suppressed when the rib width accounts for 50% or smaller and that it is almost completely prevented when the rib width accounts for 40% or smaller.

The present application claims priority to Patent Application No. 2007-314746 filed in Japan on Dec. 5, 2007 under the Paris Convention and provisions of national law in a designated State, the entire contents of which are hereby incorporated by reference.

EXPLANATION OF NUMERALS AND SYMBOLS

Figure 1:
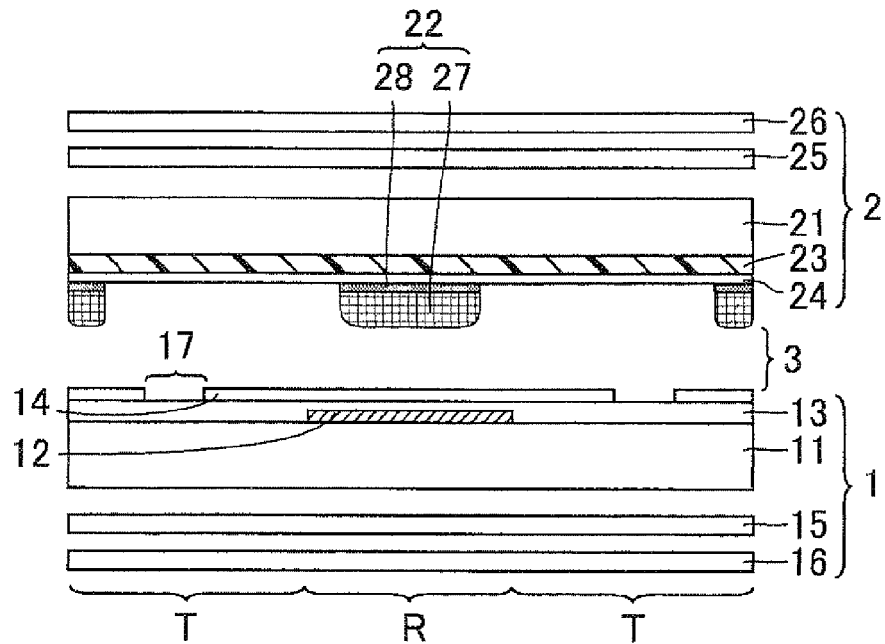
FIG. 1 is a cross-sectional view schematically showing a configuration of the LCD device of Embodiment 1.
Figure 2:
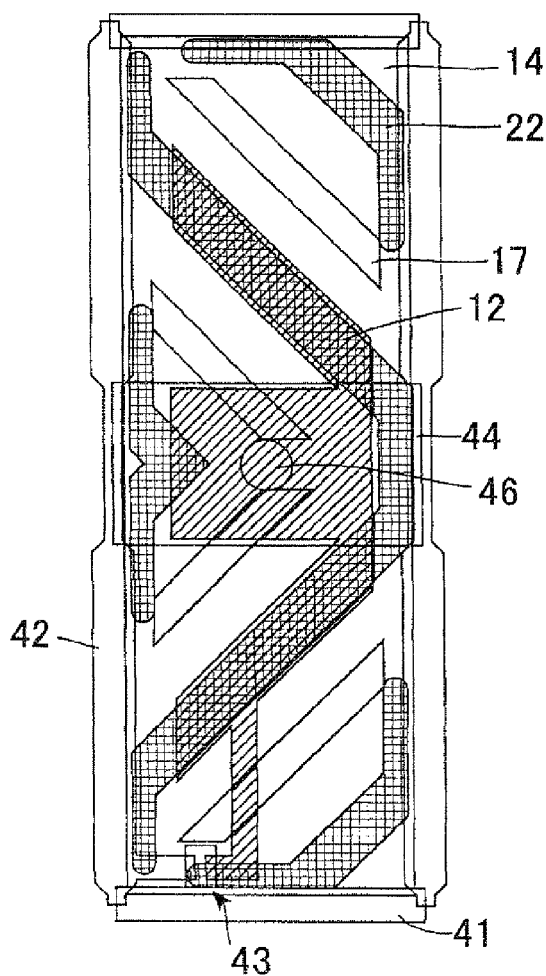
FIG. 2 is a schematic plan view mainly showing a configuration of one pixel of Embodiment 1.
Figure 3:
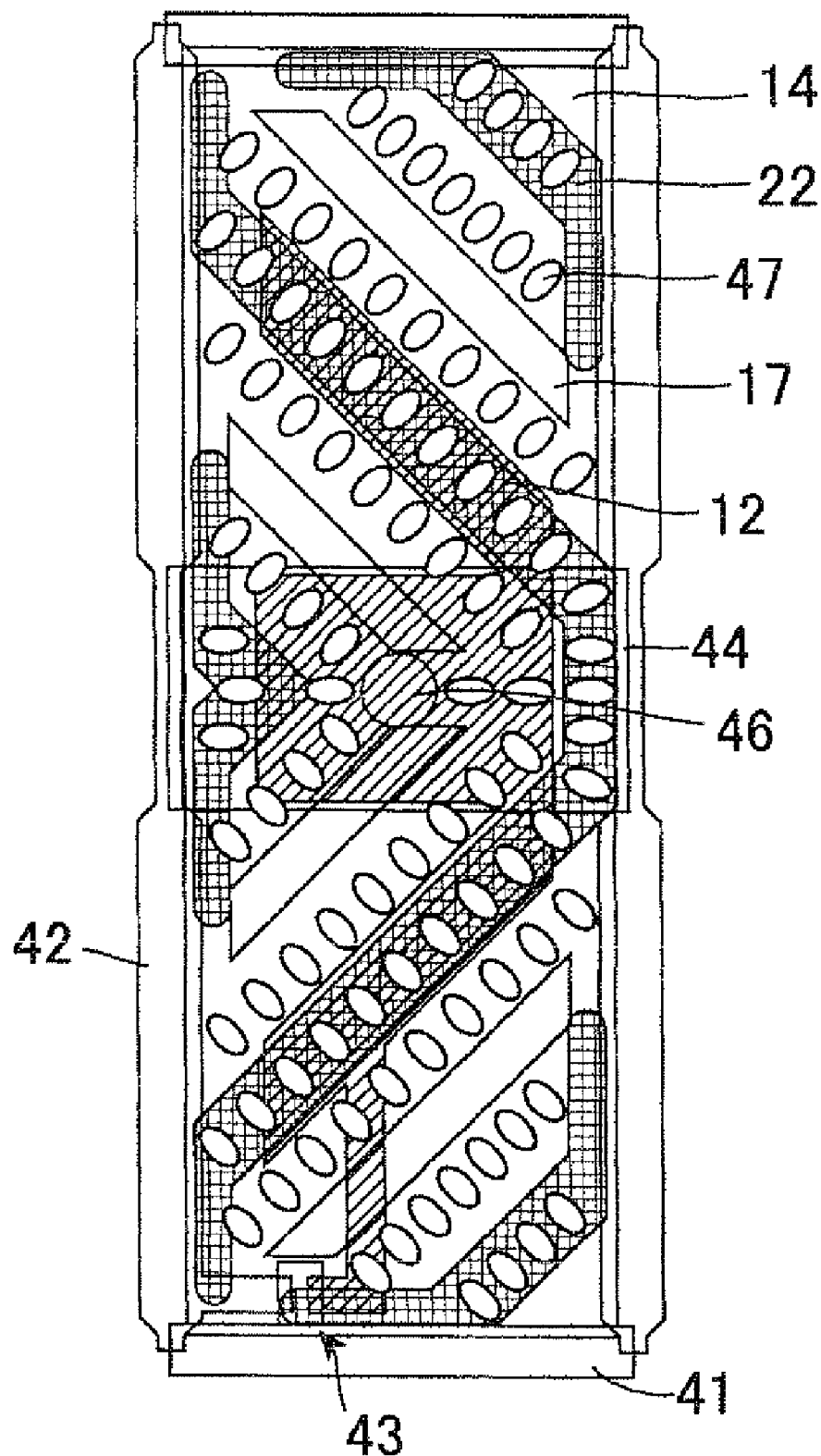
FIG. 3 is a schematic plan view mainly showing alignment directions of LC molecules in one pixel of Embodiment 1.
Figure 4:
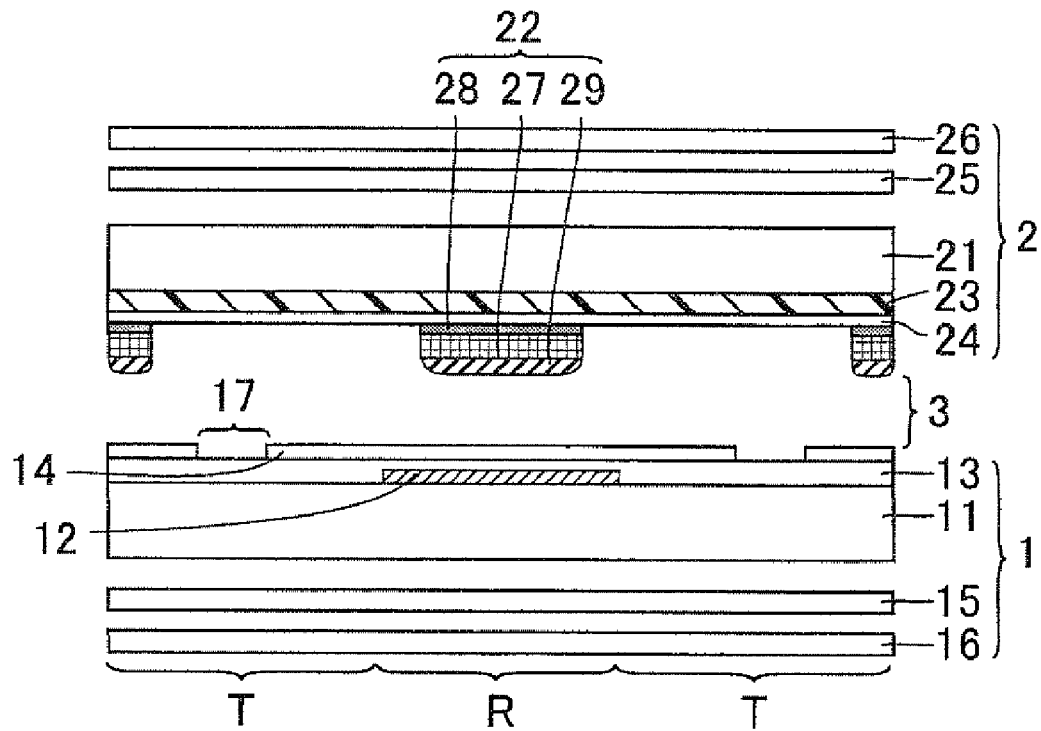
FIG. 4 is a cross-sectional view schematically showing a configuration of the LCD device of Embodiment 2.
Figure 5:
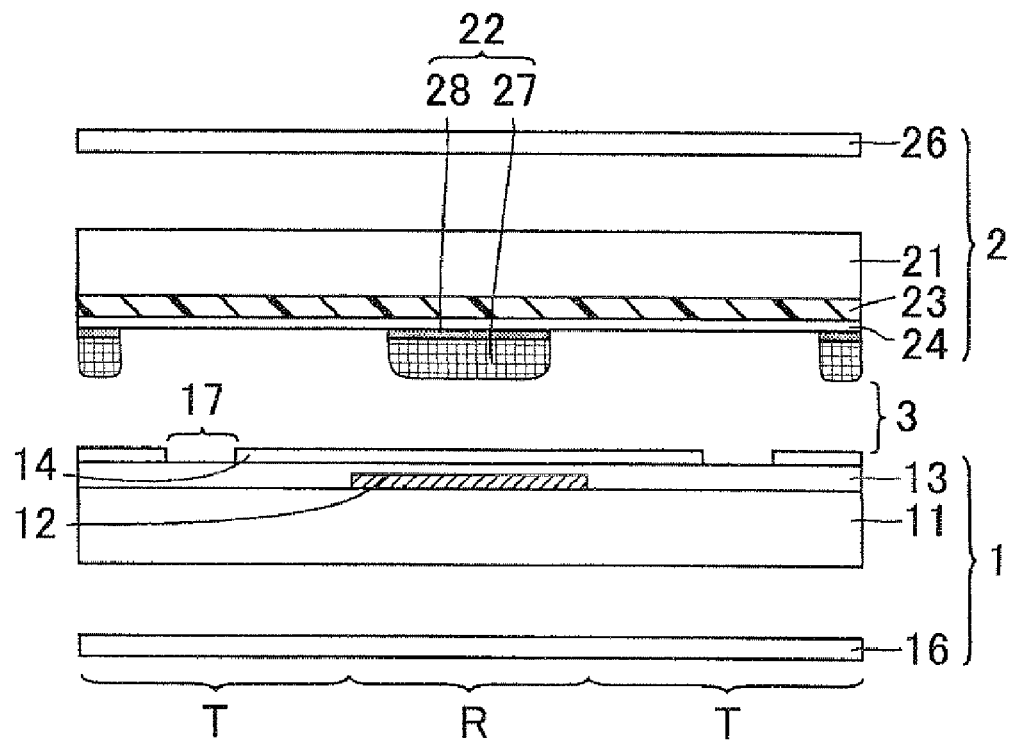
FIG. 5 is a cross-sectional view schematically showing a configuration of the LCD device of Embodiment 3.
Figure 6:
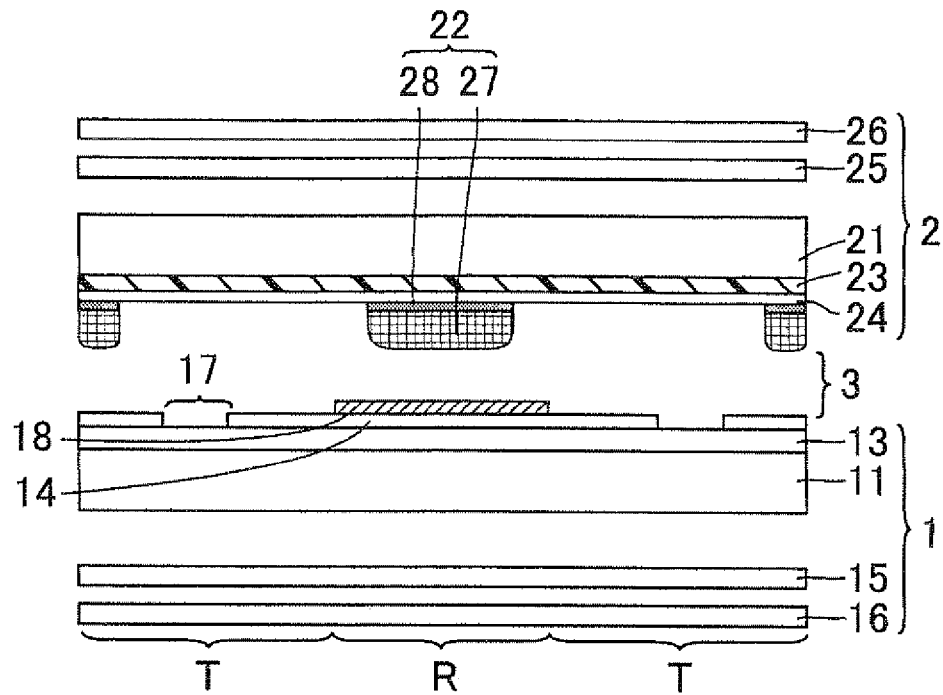
FIG. 6 is a cross-sectional view schematically showing a configuration of the LCD device of Embodiment 4.
Figure 7:
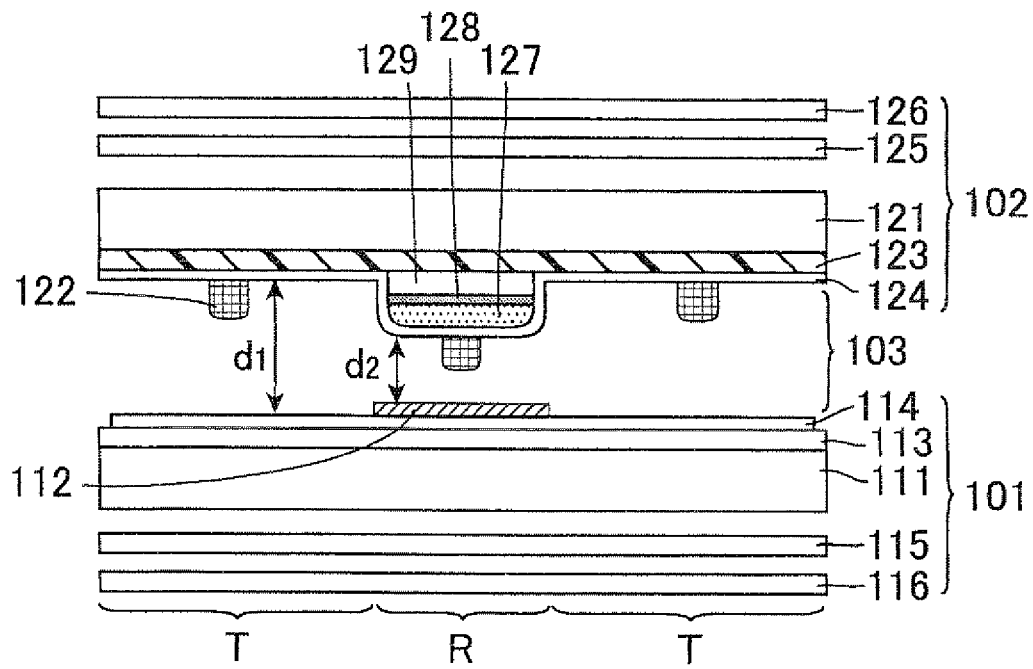
FIG. 7 is a cross-sectional view schematically showing a configuration of the LCD device of Comparative Embodiment 3.
Figure 8:
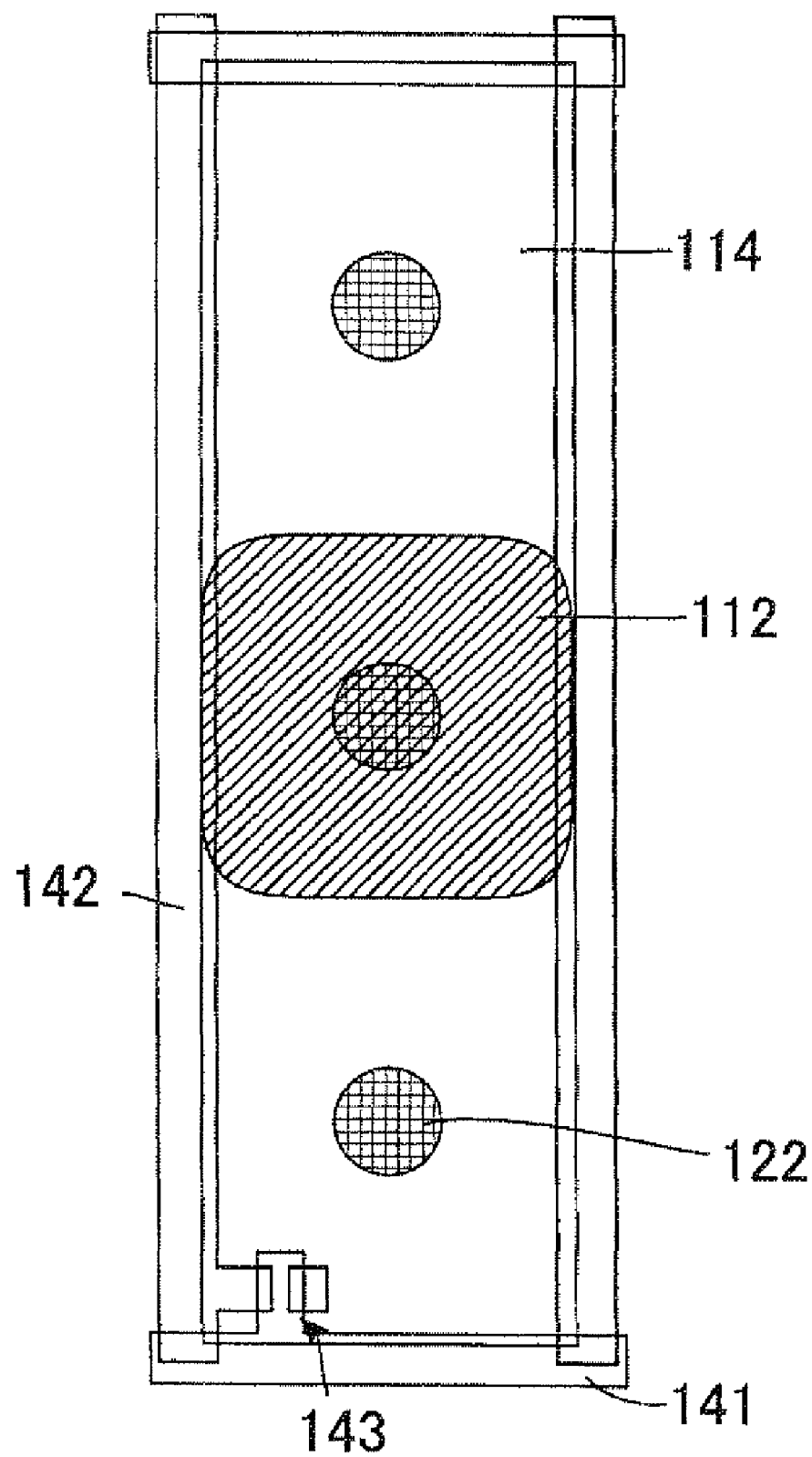
FIG. 8 is a schematic plan view mainly showing a configuration of one pixel of Comparative Embodiment 3.
Figure 9:
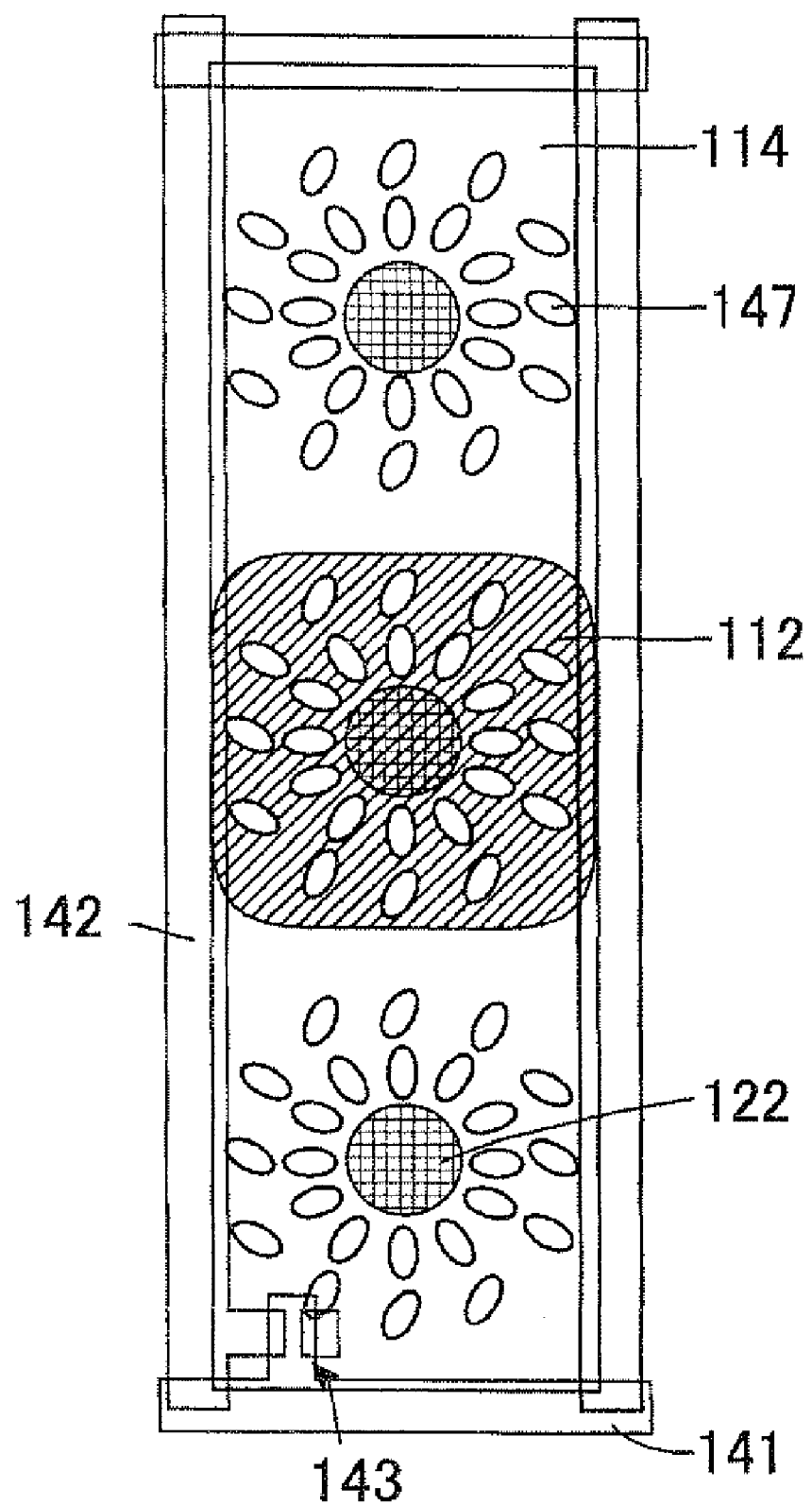
FIG. 9 is a schematic plan view mainly showing alignment directions of LC molecules in one pixel of Comparative Embodiment 3.
Figure 10:
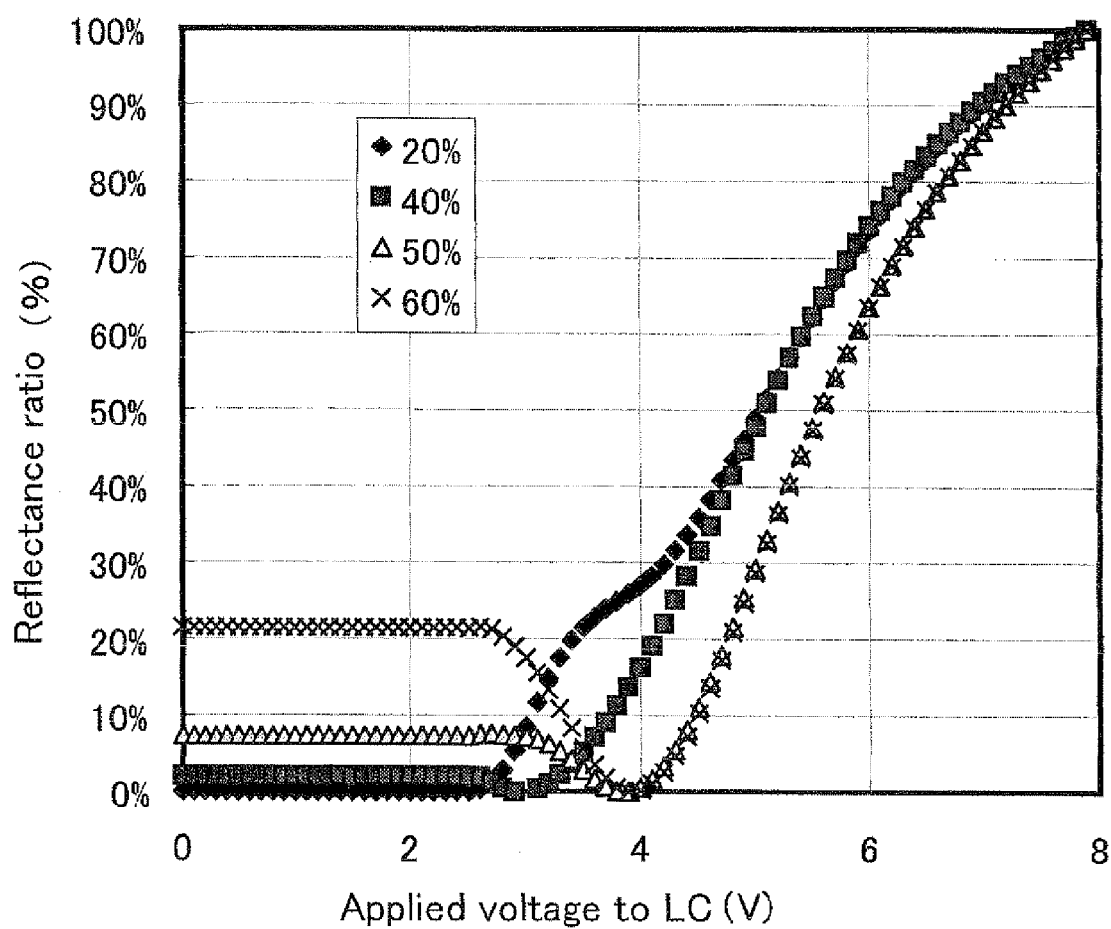
FIG. 10 is a graph showing a ratio of a reflectance in black display state to a reflectance in white display state, relative to a voltage applied to LC, determined by varying the width of the light-shielding region.

| | |
|---|---|
| 1, 101: | First substrate |
| 2, 102: | Second substrate |
| 3, 103: | Liquid crystal layer |
| 11, 111: | First glass substrate |
| 12, 112: | Reflector (drain-drawing line) |
| 13, 113: | Insulating film |
| 14, 114: | Pixel electrode |
| 15, 115: | First λ/2 retardation layer |
| 16, 116: | First polarizer |
| 17, 117: | Slit (electrode slit) |
| 18: | Reflector |
| 21, 121: | Second glass substrate |
| 22, 122: | Alignment control projection, Rib, Rivet |
| 23, 123: | Color filter layer |
| 24, 124: | Common electrode |
| 25 and 125: | Second λ/2 retardation layer |
| 26, 126: | Second polarizer |
| 27 and 127: | λ/4 retarder |
| 28, 128: | Retardation control alignment film |
| 29: | Top portion |
| 41, 141: | Gate line |
| 42, 142: | Data line |
| 43, 143: | TFT |
| 44, 144: | Storage capacitor line |
| 46, 146: | Contact hole |
| 47, 147: | Liquid crystal molecule |
| 129: | Flattening layer |
| T: | Transmission region |
| R: | Reflection region |

The invention claimed is:

1. A liquid crystal display device comprising:
a first substrate;
a liquid crystal layer; and
a second substrate in this order toward a display face,
wherein each of the first and second substrates includes a polarizer and a transparent electrode,
the first substrate includes a reflector,
the liquid crystal layer contains a liquid crystal material with negative dielectric anisotropy,
at least one of the first and second substrates includes a λ/4 retarder including a dielectric material,
the λ/4 retarder is arranged to overlap with the reflector when viewed from the display face, and
the λ/4 retarder is arranged on a liquid crystal side of the transparent electrode.

2. The liquid crystal display device according to claim 1, wherein the λ/4 retarder has a linear shape when viewed from the display face, and
the λ/4 retarder projects toward the liquid crystal layer when viewed in a direction parallel to the display face.

3. The liquid crystal display device according to claim 2, wherein the reflector has a linear shape when viewed from the display face, and
the λ/4 retarder has a width smaller than a width of the reflector.

4. The liquid crystal display device according to claim 3, wherein the λ/4 retarder is positioned within a region where the reflector is arranged, and
a distance from a first side of the reflector and a first side of the λ/4 retarder is the same as a distance from a second side of the reflector and a second side of the λ/4 retarder.

5. The liquid crystal display device according to claim 1, wherein a retardation control alignment film is arranged between the λ/4 retarder and the transparent electrode.

6. The liquid crystal display device according to claim 1, wherein the reflector is a pixel driving line.

* * * * *